E. HOYT.

CHAIN PUMP BUCKET.

No. 7,025. Reissued April 4, 1876.

WITNESSES:

Colborne Brookes

James Greenwood Jr.

Edwin Hoyt

INVENTOR.

Per Rd. A. P. Lacey

ATTORNEY.

H. PETERS, PHOTO-LITHOGRAPHER, WASHINGTON, D. C.

UNITED STATES PATENT OFFICE.

EDWIN HOYT, OF STAMFORD, CONNECTICUT.

IMPROVEMENT IN CHAIN-PUMP BUCKETS.

Specification forming part of Letters Patent No. 163,013, dated May 11, 1875; reissue No. 7,025, dated April 4, 1876; application filed February 25, 1876.

*To all whom it may concern:*

Be it known that I, EDWIN HOYT, of Stamford, in the county of Fairfield and State of Connecticut, have invented certain new and useful Improvements in Chain-Pump Buckets; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention relates to improvements in chain-pump buckets; and it consists in the peculiar construction of the links, whereby the buckets may be more readily retained in their proper position, and in the construction and formation of the buckets.

Figure 1:
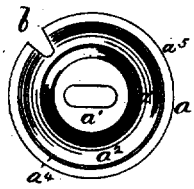
Figure 2:
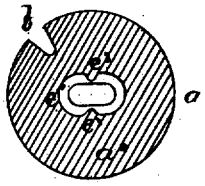
Figure 3:
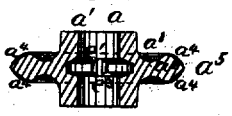
Figure 4:
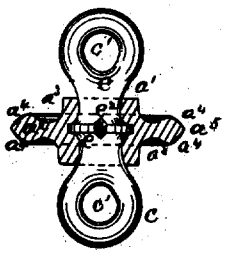

In the drawings, Figure 1 is a plan view, Fig. 2 is a horizontal section, Fig. 3 a vertical section of one of my improved buckets, and Fig. 4 is a vertical section of a bucket applied to a link.

*a* is the bucket, made of india-rubber. It is formed with a central hub, $a^1$, around which is formed a flange or rim, $a^2$, having annular indentations $a^3$ on the upper and under sides thereof, thereby giving the same form to both sides of the bucket, so that it is immaterial which side is placed uppermost in the pump. These annular indentations or grooves $a^3$ increase the lifting capacity of the bucket, and, without weakening the latter, give a flexibility to the rim or flange.

The periphery of the flange or rim $a^2$ is provided with curved or convex surfaces $a^4$ $a^4$, which unite on the central line of the circumference thereof and form a thin edge, $a^5$, which construction facilitates a ready adjustment and close fit, whether in direct or reverse movement of the bucket *a* to the sides of the pump-tube. In the periphery of the rim is formed a V shaped recess, *b*. This recess admits air from an upper to a lower bucket, so that when the pumping is stopped the water in the pump will fall immediately to the bottom. It also admits of the compression and expansion of the rim in the direction of the circumference when necessary on account of any slight variation of the size of the tube in which it is used, and thus prevents an unequal wearing away of the bucket.

*c* is the link, which carries the bucket. It is constructed with the eyes $c'$ at each end for receiving connecting-links to form the chain. In the center of the link is formed a flange, *e*, which fits in the recess $e^1$ formed in the center of the hub $a^1$ of the bucket, and which, extending on the central line of the hub, operates not only to prevent the latter from sliding back and forth on the link, but it increases the strength of the bucket, and prevents any sagging or drawing away from the shaft of the link, as is the case where the link is of ordinary construction. One or more recesses, $e^2$, are formed in the flange *e*, into which fit corresponding projections $e^3$ formed on the interior of the recess $e^1$, which construction and arrangement prevents the revolution or turning of the bucket on the link. Instead of forming the flange *e*, as shown, with recesses $e^2$, it will be readily understood that one or more projections thereon, fitting into corresponding recesses or depressions in the recess $e^1$, would secure the same result, but I prefer to employ the construction shown.

The buckets are formed on the links on which they are to be used. The material of which the buckets are formed is prepared and made sufficiently plastic to be applied and pressed by suitable molds into the desired shape on the link. By this means of construction the parts will fit closely and securely together.

The buckets after being formed on the links as described may be, if desired, sprung off and applied to other links. This, however, is attended with some difficulty, and is seldom or never required.

By forming my improved bucket as shown, it is reversible, so that when, by the action of the pressure exerted upon it, the rim *a* becomes bent or set in one direction, it can be reversed and inverted, and if the chain from any cause be made to revolve in an opposite direction to that necessary to raise the water, no injury will be done the buckets, as the latter, by reason of their peculiar construction, will readily adapt themselves to the reverse movement.

Having described my invention, what I claim, and desire to secure by Letters Patent, is—

1. An india-rubber bucket, $a$, constructed with a central hub, $a^1$, having the recess $e^1$, adapted to be applied to a link, $c$, having the central flange $e$, substantially as and for the purpose set forth.

2. An india-rubber bucket, $a$, constructed with a flange or rim, $a^2$, having curved or convex surfaces $a^4$ uniting and forming a slim edge, $a^5$, substantially as described.

3. An india-rubber bucket, $a$, constructed with a hub, $a^1$, and a flange or rim, $a^2$, having a groove, $a^3$, and curved or convex surfaces $a^4$, substantially as described.

4. An india-rubber bucket, $a$, constructed with a central hub, $a^1$, having the recess $e^1$ and provided with projections $e^3$, adapted to be received within recesses on a link, and a flange, $a^2$, provided with a V-shaped recess, $b$, substantially as and for the purposes set forth.

5. A link, $c$, provided with eyes or loops $c'$, and a central flange, $e$, formed with recesses $e^2$ in its periphery, substantially as and for the purposes set forth.

In testimony that I claim the foregoing I have hereunto set my hand this 22d day of February, 1876.

EDWIN HOYT.

Witnesses:

SAML. H. COHEN,

D. H. CLARK.